July 27, 1926.
A. L. SEGELHORST
1,593,883
TOOL JOINT
Filed August 8, 1923　　2 Sheets-Sheet 1
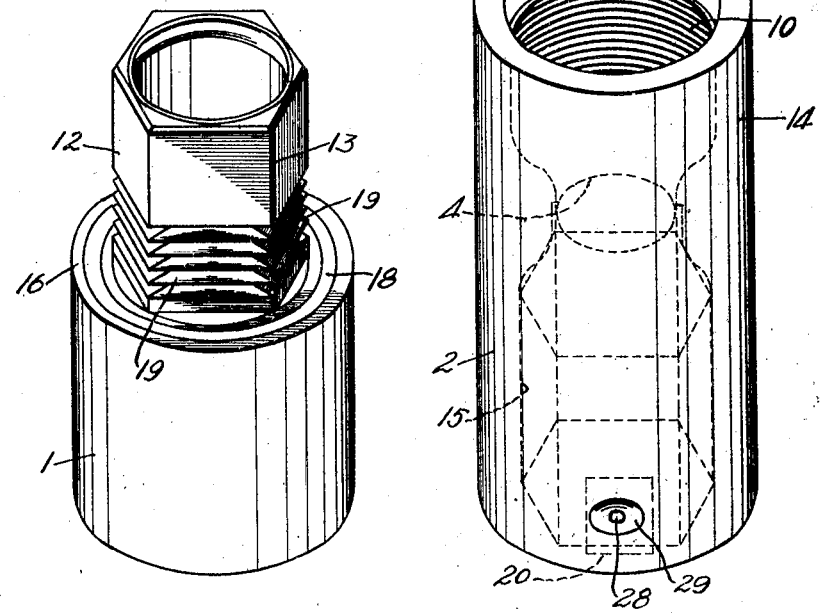
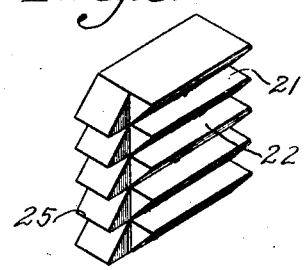
INVENTOR:
August L. Segelhorst,
By Graham + Davis
ATTORNEYS.

July 27, 1926.
A. L. SEGELHORST
1,593,883
TOOL JOINT
Filed August 8, 1923    2 Sheets-Sheet 2
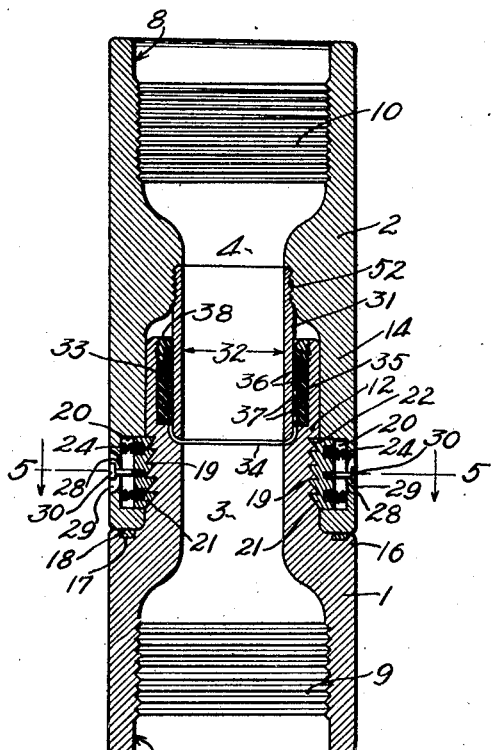
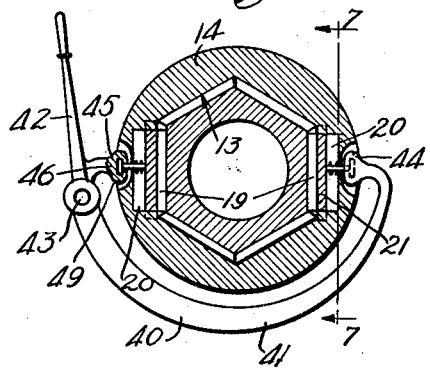
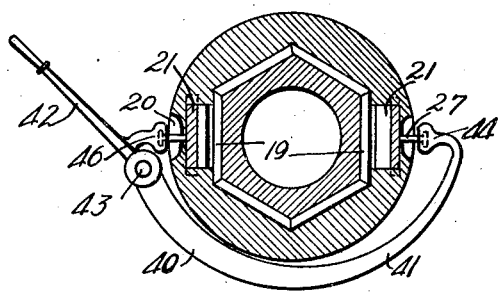
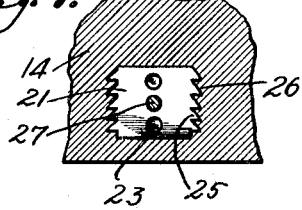
INVENTOR:
August L. Segelhorst,
By Graham + Davis
ATTORNEYS.

Patented July 27, 1926.

1,593,883

UNITED STATES PATENT OFFICE.

AUGUST L. SEGELHORST, OF WHITTIER, CALIFORNIA.

TOOL JOINT.

Application filed August 8, 1923. Serial No. 656,368.

My invention relates to tool joints particularly useful in the oil industry for joining together the stands of oil well rotary drill pipe.

In the use of the standard "pin and box" joint it is necessary to rotate the members of said joint to screw together or to unscrew said members in order to connect or disconnect the stands of the drill pipe. This is a difficult, slow and expensive operation since the pipe stands are ninety feet in length and are very heavy, and require the use of power and the services of several derrick hands to rotate them in order to join or disconnect them.

The general object of my invention is to provide a tool joint by means of which the pipe stands may be readily and quickly connected or disconnected by one man on the oil well derrick.

A more particular object is to provide a tool joint by means of which the pipe stands may be connected together or disconnected without rotating the same.

Further objects and advantages will be made evident hereinafter.

Referring to the drawings which are for illustrative purposes only:—

Fig. 1 is a perspective view of the male member of my tool joint.

Fig. 2 is a perspective view of the female member of my tool joint.

Fig. 3 is a perspective view of one of the locking dogs.

Fig. 4 is a longitudinal axial section of my tool joint assembled and the members thereof interengaged and locked together.

Fig. 5 is a cross section of my tool joint taken on line 5—5 of Fig. 4, and showing a wrench applied to the dogs for the purpose of withdrawing said dogs from locking position to unlock the joint.

Fig. 6 is a view similar to Fig. 5 showing the dogs withdrawn by the wrench into unlocking position and the joint unlocked.

Fig. 7 is a detailed sectional view taken on line 7—7 of Fig. 5 illustrating the manner in which the locking dogs are operatively mounted.

Fig. 8 is a front view of one of the wrench engaging elements.

My tool joint includes two members, a male member 1 and a female member 2, which are respectively provided with longitudinal bores 3 and 4 corresponding in diameter to the diameter of the bore 5 of the rotary drill pipe 6, to which said members are connected. The bores 3 and 4 of the members 1 and 2 are enlarged a portion of their length from their outer ends as indicated at 7 and 8 respectively, to fit over the ends of two adjoining stands of drill pipes, and said bore enlargements are provided with internal threads 9 and 10 for engaging the external threads 11 on said ends of said drill pipe stands whereby said members are screw seated on the ends of said stands.

The inner end portion of the male member 1 is reduced in diameter to form a non-circular head or male element 12, the regular polygonal exterior of which may be hexagonal in shape as indicated at 13, adapted to fit within a correspondingly non-circular socket or female element 14, formed at the inner end portion of the female member 2, the bore 4 of said female member being enlarged within said female element and shown as hexagonal, as indicated at 15, to accommodate and interfit with said male or head element 12. When the male element is inserted within the female element their interengaging hexagonal faces 13 and 15 properly align said elements so that the teeth 19, shown as disposed on a supporting neck below the mentioned head, will be positioned for engagement by dogs 21, and the members 1 and 2 will be prevented from rotating with relation to each other. An annular external shoulder 16 is formed on said male member at the base of the male element 12, against which abuts the inner end of the female member when the male element 12 is inserted into the female element 14, said shoulder having an annular recess 17 in which fits an annular gasket 18 which engages the inner end of the female element 14 to prevent leakage between said shoulder and said end of said female element.

On the six faces of the hexagonal male element 12 near the base thereof are respectively formed six series of dog teeth 19. Two recesses 20—20 are formed in opposite faces respectively of the hexagonal bore enlargement 15 of the female element 14, in which recesses are slidably mounted two locking dogs 21—21 respectively to slide radially of said element, each of which dogs is formed on its inner face with a series of dog teeth 22 for engaging the teeth 19 to lock the members 1 and 2 together. The dogs 21—21 are each provided with recesses 23 in their outer faces to receive the inner ends of compression springs 24 which bear at their outer ends against the back walls of the recesses 20—20, whereby said dogs are normally pressed inwardly. The dog teeth 19 and 22 are pointed so that the teeth 19 escape the teeth 22 when the male element 12 is inserted into the female element 14, the springs 24 yielding to permit outward sliding movement of the dogs 21—21 for such escapement of said teeth, but said teeth interlock and prevent withdrawal of said male element from said female element. A series of dog teeth 25 pointing in opposite directions to the teeth 19 and 22 are formed on each end of the dogs 21—21, which teeth interengage with corresponding teeth 26 in the female element 14 in the ends of the recesses 20, the teeth 26 allowing the teeth 25 to slide thereon and forming strong multiple slide bearings for said dogs, whereby said dogs are firmly mounted in said female element and are enabled effectively to resist any tendency of the joint members 1 and 2 pulling apart under the great strains to which the joint is subjected. Screws 27, seated in the dogs 21—21, project outwardly through apertures 28 in the female element 14 into recesses 29 in the outside of said element, there being heads 30 formed on the outer ends of said screws, which heads rest within said recesses.

A nipple 31 is screw seated at one end as indicated at 52 within the bore 4 intermediate the ends of female member 2, which nipple extends from its seat toward the lower end of said female member. The bore 32 of said nipple corresponds in diameter to the diameters of the joint bores 3 and 4 and to the diameter of the drill pipe bore 5. The male element 12 is provided at its upper end with an internal annular recess 33 and with a similar recess 34, below said recess but of less diameter than recess 33, to receive the nipple 31 when the members 1 and 2 are assembled and interengaged. A rubber packing 35 is seated within the recess 33 for engaging the nipple 31 to prevent leakage between said nipple and the male element 12, thus forming an effective oiltight seal between the male and female members 1 and 2 of the joint, when said members are interengaged. The inner surface of the packing 35 may be formed with annular superimposed grooves 36 to provide superimposed annular ribs 37 for more effectively engaging the nipple 31 than a plain surface, which is liable to wear unevenly and permit leakage, thus providing a most efficient packing for the joint. A gland 38 is screw seated in the upper end of the male element 12 and engages the upper end of the packing 35 to retain said packing within the recess 33.

For unlocking my joint I use a wrench 40 which comprises an arcuate arm 41, a handle 42 pivoted to one end of said arm at 43, an engaging part 44 on the other end of said arm and an engaging part 45 on said handle near said pivot 43. Each inwardly extending engaging part 44 and 45 is provided with an under-cut recess 46 open at one end as indicated at 47 and closed at its upper end as indicated at 48, the under-cut 49 forming an inturned flange 50 at the edges of the recess except at the open end 47.

In applying the wrench the arm 41 is extended around one-half of the female member 2 and the engaging parts 44 and 45 placed in the recesses 29—29 above the heads 30—30. The wrench is then lowered so that the screws 27—27 and said heads enter the recesses 46—46 in the engaging parts 44 and 45, through the lower open ends 47 of said recesses, said heads 30—30 entering the under-cut portions 49 of said recesses 46 until the upper ends 48 of the recesses 46 rest upon said heads 30—30, in which position the flanges 50 engage the inner sides of the heads 30—30. Upon swinging the lever 42 outwardly on its pivot the engaging parts 44 and 45 are caused to move apart and draw the dogs 21—21 outwardly so that their teeth 22 will disengage the teeth 19 and unlock the male and female members 1 and 2, which members may then be disengaged.

I claim as my invention:—

1. In a tool joint as disclosed: a non-circular male member; an interfitting female member adapted to receive said male member; means for locking said members together; and a threaded nipple in said female member adapted to extend into the end of said male member when said members are locked together for forming an effective oiltight seal between said members.

2. In a tool joint as disclosed: a non-circular male member; an interfitting female member adapted to receive said male member; means for locking said members together; a threaded nipple in said female member adapted to extend into the end of said male member when said members are locked together; and a packing in the end of said male member for engaging said nipple and forming an oiltight joint between said members.

3. In a tool joint as disclosed: a non-circular male member; an interfitting female member adapted to receive said male member; means for locking said members together; a threaded nipple in said female member adapted to extend into the end of said male member when said members are locked together; and a rubber packing in the end of said male member for engaging said nipple and forming an oiltight joint between said members.

4. In a tool joint as disclosed: a non-circular male member; an interfitting female member adapted to receive said male member; means for locking said members together; a threaded nipple in said female member adapted to extend into the end of said male member when said members are locked together; a packing in the end of said male member for engaging said nipple and forming an oiltight joint between said members; and a gland screw seated in the upper end of said male member for retaining said packing in said male member.

5. In a tool joint comprising parts connected without threads but adapted to transmit rotary motion as disclosed: a pair of co-acting members providing a substantially cylindrical exterior free from projections when assembled and respectively provided with non-circular interfitting elements in the form of a head and a socket, both regularly polygonal in cross-sectional outline; means comprising teeth on a neck supporting said head and engageable by teeth on a dog for automatically connecting together said members when brought together; and means for aligning said members when brought together so that said dogs will register with and engage said teeth.

6. In a tool joint comprising parts connected without threads but adapted to transmit rotary motion as disclosed: a non-circular male member provided with a head; an interfitting female member adapted to receive said male member; and means comprising teeth on a neck supporting said head and engageable by teeth on a dog for automatically locking said members together when brought together, the interengaging parts of said female member and said male member being regular polygons in cross-sectional outline and adapted to properly align said members for locking and to prevent relative rotation of said members.

In testimony whereof, I have hereunto set my hand at Los Angeles, California, this 3rd day of August, 1923..

AUGUST L. SEGELHORST.